(12) United States Patent
Zia et al.

(10) Patent No.: US 11,017,690 B1
(45) Date of Patent: May 25, 2021

(54) SYSTEM AND METHOD FOR BUILDING COMPUTATIONAL MODELS OF A GOAL-DRIVEN TASK FROM DEMONSTRATION

(71) Applicant: Retrocausal, Inc., Sammamish, WA (US)

(72) Inventors: Muhammad Zeeshan Zia, Sammamish, WA (US); Quoc-Huy Tran, Redmond, WA (US); Andrey Konin, Redmond, WA (US); Sanjay Haresh, Karachi (PK); Sateesh Kumar, Karachi (PK)

(73) Assignee: Retrocausal, Inc.

( * ) Notice: Subject to any disclaimer, the term of this patent is extended or adjusted under 35 U.S.C. 154(b) by 0 days.

(21) Appl. No.: 17/126,068

(22) Filed: Dec. 18, 2020

Related U.S. Application Data

(60) Provisional application No. 62/967,430, filed on Jan. 29, 2020.

(51) Int. Cl.
| | |
|---|---|
| *G06T 7/73* | (2017.01) |
| *G09B 19/00* | (2006.01) |
| *G06K 9/00* | (2006.01) |
| *G06N 3/08* | (2006.01) |
| *G06N 3/06* | (2006.01) |

(Continued)

(52) U.S. Cl.
CPC ....... *G09B 19/003* (2013.01); *G06K 9/00718* (2013.01); *G06K 9/00744* (2013.01); *G06K 9/00765* (2013.01); *G06N 3/06* (2013.01); *G06N 3/08* (2013.01); *G06T 7/73* (2017.01); *G09B 5/065* (2013.01); *G06T 2207/10016* (2013.01); *G06T 2207/30241* (2013.01); *H04N 5/77* (2013.01)

(58) Field of Classification Search
None
See application file for complete search history.

(56) References Cited

U.S. PATENT DOCUMENTS

| | | | |
|---|---|---|---|
| 9,495,882 | B2 | 11/2016 | Cohen et al. |
| 2011/0320240 | A1 | 12/2011 | Flores et al. |

(Continued)

FOREIGN PATENT DOCUMENTS

| | | |
|---|---|---|
| CN | 109087545 A | 12/2018 |
| WO | 2019217247 A1 | 11/2019 |

*Primary Examiner* — Eileen M Adams
(74) *Attorney, Agent, or Firm* — Jason C. Cameron

(57) ABSTRACT

A system for building computational models of a goal-driven task from demonstration is disclosed. A task recording subsystem receives a recorded video file or recorded sensor data representative of an expert demonstration for a task. An instructor authoring tool generates one or more sub-activity proposals; enables an instructor to specify one or more sub-activity labels upon modification of the one or more sub-activity proposals into one or more sub-tasks. A task learning subsystem learns the one or more sub-tasks represented in the demonstration of the task; builds an activity model to predict and locate the task being performed in the recorded video file. A task evaluation subsystem evaluates a live video representative of the task; generates at least one performance description statistics; identifies a type of activity step executed by the one or more actors; provides an activity guidance feedback in real-time to the one or more actors.

19 Claims, 8 Drawing Sheets

(51) Int. Cl.
*G09B 5/06* (2006.01)
*H04N 5/77* (2006.01)

(56) References Cited

U.S. PATENT DOCUMENTS

| | | | |
|---|---|---|---|
| 2013/0179236 A1* | 7/2013 | Hicyilmaz | G06Q 10/06398 |
| | | | 705/7.42 |
| 2016/0012739 A1* | 1/2016 | Jafari | G09B 5/06 |
| | | | 434/353 |
| 2018/0021647 A1 | 1/2018 | Wrigg | |
| 2018/0197428 A1* | 7/2018 | Baphna | G09B 7/00 |
| 2020/0167715 A1 | 5/2020 | Bhatt et al. | |
| 2020/0210768 A1* | 7/2020 | Turkelson | G06K 9/6267 |

* cited by examiner

SYSTEM AND METHOD FOR BUILDING COMPUTATIONAL MODELS OF A GOAL-DRIVEN TASK FROM DEMONSTRATION

EARLIEST PRIORITY DATE

This application claims priority from a Provisional patent application filed in the United States of America having Patent Application No. 62/967,430, filed on Jan. 29, 2020, and titled "AUTOMATICALLY BUILDING COMPUTATIONAL MODELS OF A GOAL-DRIVEN TASK FROM RECORDED DEMONSTRATIONS AND ANALYZING ITS PERFORMANCES".

BACKGROUND

Embodiments of the present disclosure relate to a task monitoring system for organizational process management and more particularly to a system and a method for building computational models of a goal-driven task from a demonstration.

An important aspect of organizational process management is documentation and improvement of various workflows that represent multiple organizational processes. The various workflows performed by multiple workforces across the organizations needs to be assessed for checking whether a task has been performed and evaluating how well it has been performed. A wide variety of applications and suites exist to assist the organizations with skill assessment of the workforces. The skill assessment associated with the various workflows is essential for quality control, compliance, training, improving efficiency and well-being of the workforces. Various systems are available which utilizes one or more computerized models for the skill assessment based on the collection of activity patterns of the workforces associated with a physical task performed.

Conventionally, the system available for monitoring and analysis of performance of the workforces requires manually re-modeling the system for capturing every new task specifically. However, re-modeling of such a conventional system manually for every new task requires building specific configurations of sensors and connecting such configurations through computational logic. Also, such a conventional system involves labeling large amounts of training data and implementing domain knowledge in a form of computer code and customized machine learning models to understand temporal patterns of human-object interactions in the workflows specific to the physical tasks assigned. Moreover, such customized machine learning models specific to each of the physical tasks do not provide scalable task understanding because often the tasks assigned to the workforces have complex conditional decisions or random worker behavior as opposed to a linear progression of steps.

Furthermore, such conventional system with existing artificial learning technologies offer software development kits (SDKs) that estimate poses or location of one or more objects and the workforces represented in images or video frames associated with the activity patterns. Again, such a conventional system in order to understand a specific physical task assigned needs customized computer codes developed by one or more domain experts. In addition, such a conventional system is time-consuming and ineffective in case if one or more complex activities with sub-task structures that have decisions or randomness involved are assigned.

Hence, there is a need for an improved system and a method for building computational models of a goal-driven task from a demonstration in order to address the aforementioned issues.

BRIEF DESCRIPTION

In accordance with an embodiment of the present disclosure, a system for building computational models of a goal-driven task from demonstration is disclosed. The system includes a task recording subsystem configured to receive a recorded video file or recorded sensor data representative of an expert demonstration for a task under consideration from a database. The system also includes an instructor authoring tool operatively coupled to the task recording subsystem. The instructor authoring tool is configured to generate one or more sub-activity proposals from the recorded video file or the recorded sensor data received. The instructor authoring tool is also configured to enable an instructor to specify one or more sub-activity labels for the task accomplishment upon modification of the one or more sub-activity proposals into one or more sub-tasks. The system also includes a task learning subsystem operatively coupled to the instructor authoring tool. The task learning subsystem is configured to learn the one or more sub-tasks represented in the demonstration of the task based on the recorded video file, the recorded sensor data received, and the one or more sub-activity labels specified. The task learning subsystem is also configured to build an activity model to predict and locate the task being performed in the recorded video file based on the one or more sub-tasks learnt using at least one of a task learning approach. The system also includes a task evaluation subsystem operatively coupled to the task learning subsystem. The task evaluation subsystem is configured to evaluate a live video representative of the goal-driven task comprising an interaction between one or more actors and one or more objects based on the activity model built. The task evaluation subsystem is also configured to generate at least one performance description statistics based on an evaluation of the live video corresponding to the recorded video file or the recorded sensor data. The task evaluation subsystem is also configured to identify a type of activity step executed by the one or more actors in the goal-driven task based on the performance description statistics generated. The task evaluation subsystem is also configured to provide an activity guidance feedback in real-time to the one or more actors using one or more types of alerts based on the type of the activity step identified. The system also includes a continuous adaptation subsystem operatively coupled to the task evaluation subsystem. The continuous adaptation subsystem is configured to enable enhancement of the activity model based on the activity guidance feedback provided upon evaluation of the live video.

In accordance with another embodiment of the present disclosure, a method for building computational models of a goal-driven task from demonstration is disclosed. The method includes receiving, by a task recording subsystem, a recorded video file or recorded sensor data representative of an expert demonstration for a task under consideration from a database. The method also includes generating, by an instructor authoring tool, one or more sub-activity proposals from the recorded video file or the recorded sensor data received. The method also includes enabling, by the instructor authoring tool, an instructor to specify one or more sub-activity labels for the task accomplishment upon modification of the one or more sub-activity proposals into one or more sub-tasks. The method also includes learning, by a task learning subsystem, the one or more sub-tasks represented in the demonstration of the task based on the recorded video file, the recorded sensor data received, and the one or more sub-activity labels specified. The method also includes building, by the task learning subsystem, an activity model to predict and locate the task being performed in the recorded video file based on the one or more sub-tasks learnt using at least one of a task learning approach. The method also includes evaluating, by a task evaluation subsystem, a live video representative of the goal-driven task comprising an interaction between one or more actors and one or more objects based on the activity model built. The method also includes generating, by the task evaluation subsystem, at least one performance description statistics based on evaluation of the live video corresponding to the recorded video file or the recorded sensor data. The method also includes identifying, by the task evaluation subsystem, a type of activity step executed by the one or more actors in the goal-driven task based on the performance description statistics generated. The method also includes providing, by the task evaluation subsystem, an activity guidance feedback in real-time to the one or more actors using one or more types of alerts based on the type of the activity step identified. The method also includes enabling, by a continuous adaptation subsystem, enhancement of the activity model based on the activity guidance feedback provided upon evaluation of the live video.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
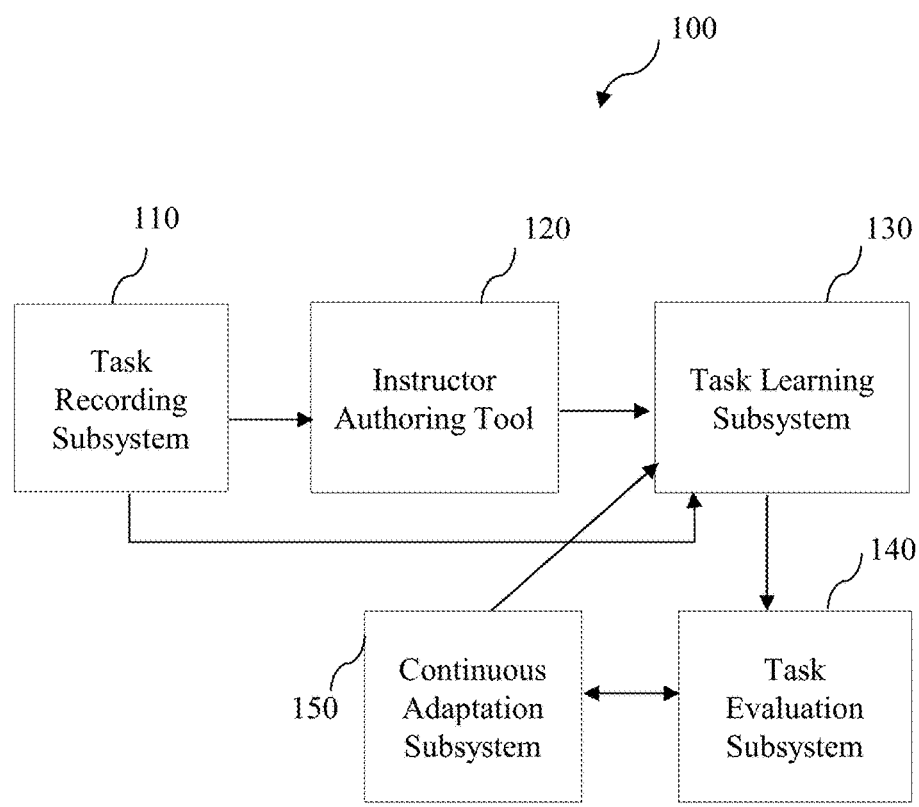
FIG. 1 is a block diagram of a system for building computational models of a goal driven task from demonstration in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for building computational models of a goal driven task from demonstration. The system includes a task recording subsystem configured to receive a recorded video file or recorded sensor data representative of an expert demonstration for a task under consideration from a database. The system also includes an instructor authoring tool operatively coupled to the task recording subsystem. The instructor authoring tool is configured to generate one or more sub-activity proposals from the recorded video file or the recorded sensor data received. The instructor authoring tool is also configured to enable an instructor to specify one or more sub-activity labels for the task accomplishment upon modification of the one or more sub-activity proposals into one or more sub-tasks. The system also includes a task learning subsystem operatively coupled to the instructor authoring tool. The task learning subsystem is configured to learn the one or more sub-tasks represented in the demonstration of the task based on the recorded video file, the recorded sensor data received, and the one or more sub-activity labels specified. The task learning subsystem is also configured to build an activity model to predict and locate the task being performed in the recorded video file based on the one or more sub-tasks learnt using at least one of a task learning approach. The system also includes a task evaluation subsystem operatively coupled to the task learning subsystem. The task evaluation subsystem is configured to evaluate a live video representative of the goal-driven task comprising an interaction between one or more actors and one or more objects based on the activity model built. The task evaluation subsystem is also configured to generate at least one performance description statistics based on an evaluation of the live video corresponding to the recorded video file or the recorded sensor data. The task evaluation subsystem is also configured to identify a type of activity step executed by the one or more actors in the goal-driven task based on the performance description statistics generated. The task evaluation subsystem is also configured to provide an activity guidance feedback in real-time to the one or more actors using one or more types of alerts based on the type of the activity step identified. The system also includes a continuous adaptation subsystem operatively coupled to the task evaluation subsystem. The continuous adaptation subsystem is configured to enable enhancement of the activity model based on the activity guidance feedback provided upon evaluation of the live video.

FIG. 1 is a block diagram of a system 100 for building computational models of a goal driven task from demonstration in accordance with an embodiment of the present disclosure. The system 100 includes a task recording subsystem 110 configured to receive a recorded video file or recorded sensor data representative of an expert demonstration for a task under consideration from a database. As used herein, the term 'task' is defined as a goal-driven activity performed by a human to assist in managing an organizational process. In one embodiment, the task may include, but not limited to, performing a lumbar puncture on a medical simulator, assembling a car door in an automobile manufacturing unit, assembling a printed circuit board (PCB) in a manufacturing industry and the like. In one embodiment, the recorded video file or the recorded sensor data are recorded by an image capturing device or an optical sensor respectively. The image capturing device, or the optical sensor are placed at predefined positions in an environmental setup where the task is being performed. As used herein, the term 'expert' is defined as a person who is skilled in art and performs a domain specific task using one or more objects. In some embodiment, the one or more objects may include, but not limited to, a mannequin, a car door, a PCB, a handle, a bulb and the like.

The system 100 also includes an instructor authoring tool 120 operatively coupled to the task recording subsystem 110. The instructor authoring tool (IAT) 120 is configured to generate one or more sub-activity proposals from the recorded video file 121 or the recorded sensor data received. The instructor authoring tool 120 includes a segment proposal module 122 to sample one or more sub-activity proposals for segmentation of the task represented in the recorded video file or recorded sensor data. As used herein, the term 'proposal' is defined as a start and an end time in a video where there is a prediction of an occurrence of a sub-task. The instructor authoring tool also includes a key-frame estimation module 123 configured to estimate one or more key frames in the recorded video file based on the one or more sub-activity proposals sampled for segmentation of the task. The IAT also includes a video-splicing module 124 configured to divide the recorded video file into one or more sub-clips for generating the one or more sub tasks based on the one or more key-frames estimated and the one or more sub-activity proposals proposed. In one embodiment, the one or more sub-activity proposals may include at least one of annotation of performing one or more correct sub-tasks, specification of one or more optional sub-tasks, specification of one or more essential sub-tasks, order of performance of the one or more sub-tasks, one or more constraints on the order of the performance of the one or more sub-tasks, repetitions of the one or more sub-tasks or a combination thereof.

Figure 2:
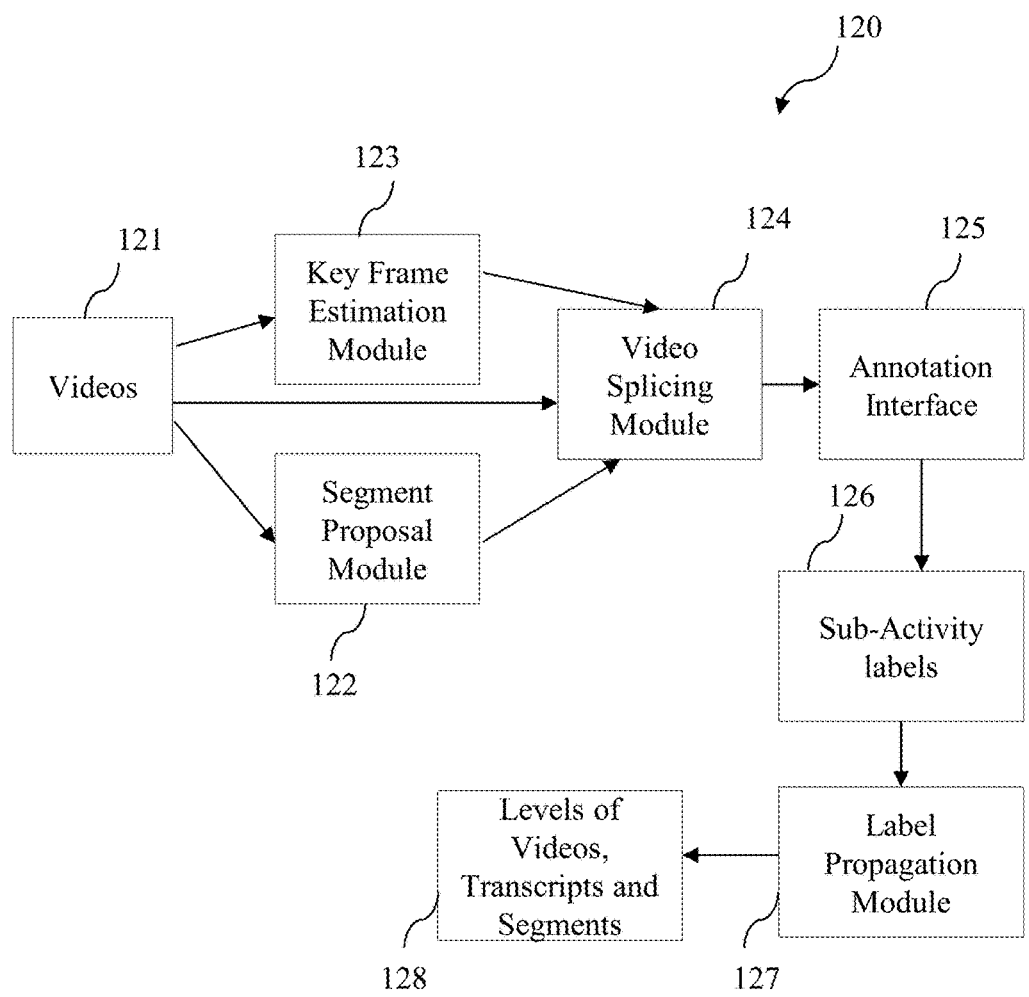
FIG. 2 is a block diagram representation of an instructor authorization tool of a system for building computational models of a goal driven task from demonstration in accordance with an embodiment of the present disclosure.

The instructor authoring tool 120 is also configured to enable an instructor to specify one or more sub-activity labels for the task accomplishment upon modification of the one or more sub-activity proposals into one or more sub-tasks. In a specific embodiment, the IAT includes an annotation interface 125 where the instructor specifies the one or more sub-activity labels. The instructor corrects one or more segment boundaries if needed and provides the one or more sub-activity labels 126. The IAT also includes a label propagation module 127 which is configured to propagate annotations of the instructor and also segments boundaries or sub-tasks clips from subset of the recorded video file to the whole dataset based on a similarity measure. The label propagation module generates labels of videos, transcripts, and the segments 128 upon correction by the instructor. The label propagation module 127 for segmentation of the sub-tasks clips is implemented using an iterative semi-supervised label propagation approach such as a K-Nearest Neighbors (k-NN) technique or a label noise cleaning approach. A block diagram representation of the instructor authoring tool with multiple modules such as the segmentation proposal module, the key-frame estimation module, the video splicing module, the annotation interface and the label propagation module is depicted in FIG. 2.

Referring to FIG. 1, the system 100 also includes a task learning subsystem 130 operatively coupled to the instructor authoring tool 120. The task learning subsystem 130 is configured to learn the one or more sub-tasks represented in the demonstration of the task based on the recorded video file, the recorded sensor data received, and the one or more sub-activity labels specified. The task learning subsystem 130 is also configured to build an activity model to predict and locate the task being performed in the recorded video file based on the one or more sub-tasks learnt using at least one of a task learning approach. As used herein, the term 'activity model' is defined as a computational model which produces an output of the one or more sub-tasks performed along with their duration in a video. In one embodiment, the task learning approach may include at least one of a differentiable alignment of videos and transcripts-based learning approach, a similarity-based video alignment approach or a model-based learning approach for extracting temporal features. In such embodiment, the differentiable alignment of the videos and transcripts-based learning approach may include utilization of a temporal neural network for alignment of a plurality of frames of the recorded video file with one or more transcripts. As used herein, the term 'transcript' is defined as an ordered set of sub-tasks performed in a video. For the differential alignment of the videos and the transcripts, a scene of the video is decomposed into object and human based representations. Such representations are then concatenated and fed to the temporal neural network. The object representations may optionally benefit from prior computer aided design (CAD) or other 3D recorded video-file of the object, and alignment against those pre-recorded representation. In one embodiment, the temporal neural network may include, but not limited to, a long short-term memory (LSTM) neural network, a temporal convolutional network (TCN), a three-dimensional convolutional neural network (CNN). A differential alignment module 132 for the differentiable alignment of videos and transcripts uses the probabilities assigned by the temporal neural network and determines the duration of each sub-activity using dynamic programming approach.

In another embodiment, the similarity-based video alignment approach includes utilization of a neural network by a similarity-based video alignment module 134 for learning computation of a similarity measure between one or more clips of the recorded video file with one or more clips of a live video. For the similarity measure, a transcript generation module understands an inherent structure of the goal-driven task, and models aspects such as permutability of certain sub-tasks. The transcripts from the learned probability distribution of the sub-tasks order and length, conditioned on sensor/video evidence are obtained upon understanding the inherent structure of the goal-driven task. The transcript generation module also generates a transcript hypothesis which is utilized for scoring against the recorded video or the recorded sensor data for selection of a best hypothesis. Once, the transcript hypothesis is generated, a clip division module sub-divides the recorded video file into clips of uniform length for further processing. The similarity-based video alignment approach also includes enabling the neural network to align the one or more clips of the recorded video file with the one or more clips of the live video based on the similarity measured. The similarity-based video alignment approach also includes assigning one or more segmentation labels corresponding to the one or more clips based on an alignment of the recorded video with the live video. The neural network also learns a similarity measure over clips from the video. At inference time, the neural network aligns the live video to all supporting recorded videos and assigns the labels from the best aligned video. In a training phase, the neural network is capable of minimizing a difference between representations of the videos which are aligned with each other by using a temporal cycle consistency loss or a Siamese loss function.

Figure 3:
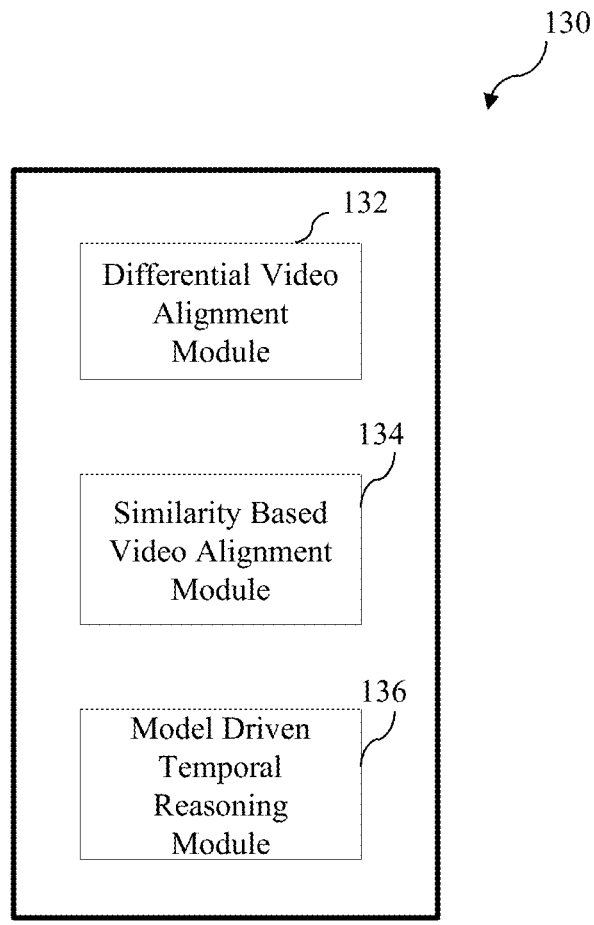
FIG. 3 is a block diagram representation of a task learning subsystem of a system for building computational models of a goal driven task from demonstration in accordance with an embodiment of the present disclosure.

In yet another embodiment, the model-based learning approach for extracting the one or more temporal features decomposes the video into multiple temporal features before feeding into a temporal reasoning model. The temporal reasoning model created by a model driven temporal learning module 136 learns to predict frame-level segmentation labels using the multiple temporal features and initial transcripts as labels. The predictions are then refined and used as pseudo-labels to iteratively improve the temporal model. The temporal reasoning model extracts the one or more temporal features including at least one of object trajectories, human and object poses from the recorded video or a combination thereof. In one embodiment, the temporal reasoning model may include, but not limited to, a hidden Markov model (HMM), a LSTM, a 3D convolutional neural network and the like. A block diagram representation of the task learning subsystem with interconnection between one or more sub-modules are represented in FIG. 3.

Referring back to FIG. 1, the system 100 also includes a task evaluation subsystem 140 operatively coupled to the task learning subsystem. The task evaluation subsystem 140 is configured to evaluate a live video representative of the goal-driven task comprising an interaction between one or more actors and one or more objects based on the activity model built. As used herein, the term 'actor' is defined as a human performing a goal-driven task as represented in a live video. Specifically, the activity model generates segmentation labels 142, and these are fed into a sub-activity statistics module 144 of the task evaluation subsystem 140 which generates sub-activity statistics including, but not limited to, number of subtasks performed, and time spent on each sub-task, time taken for each anomalies related to the task and the like. The segmentation labels 142 are also fed to a human-object interaction module 146 of the task evaluation subsystem 140 along with the video which generates human interaction statistics such as how many actors performed a task, a main actor involved in the task and the like based on the interactions of the one or more actors with the target object.

The task evaluation subsystem 140 is also configured to generate at least one performance description statistics 148 based on an evaluation of the live video corresponding to the recorded video file or the recorded sensor data. In one embodiment, the performance description statistics may include at least one of duration for each sub-tasks, number of sub-tasks performed, productivity of each actor involved in the one or more sub-tasks, a number of the one or more sub-tasks missed, the human interaction statistics of each of the one or more actors with the object or a combination thereof. The at least one performance description statistics are generated based on an implementation of a deep learning-based object detector for obtaining one or more feature representations of the one or more actors and the object, actor pose estimation, spatial relationship between the one or more actors and the object, interaction prediction or a combination thereof. As used herein, the term 'pose estimation' is defined as an estimation of a skeletal pose of each of the one or more actors depicted in the live video. Similarly, the term 'spatial relationship' is defined as closeness between the one or more actors and the object depicted in the live video. In one embodiment, the deep learning-based object detector may include, but not limited to, a faster recurrent neural network (RNN), a 3D-recurrent convolutional neural network (RCNN) and the like.

The task evaluation subsystem is also configured to identify a type of activity step executed by the one or more actors in the goal-driven task based on the performance description statistics generated. In one embodiment, the type of the activity step may include a correct step executed by the one or more actors in performing the goal-driven task. In another embodiment, the type of the activity step may include an erroneous step executed by the one or more actors in performing the goal-driven task. A density estimation model is used to learn latent distribution of observed data including statistics of erroneous sub-tasks or step performed during test performances. As used herein, the term 'density estimation model' is defined as a computational model which focusses on tagging one or more erroneous portions of test sequences, using the correct portions to improve overall activity model, and the incorrect portions to under common error modes. In one embodiment, the density estimation model may be implemented as a variational autoencoder, as a generative adversarial network (GAN), or as any standard probability distribution modeling mechanism. The task evaluation subsystem is capable of performing action classification, spatial-temporal video alignment, synthetic data augmentation, visual object discovery, detection, tracking, fine-grained categorization, worker pose estimation, motion tracking, and semantically-grounded 3D reconstruction into a novel visual programming paradigm that generates neuro-symbolic code to confirm the correct performance of an activity by the one or more actors in the live video and searches for improvements to the original process itself.

Figure 4:
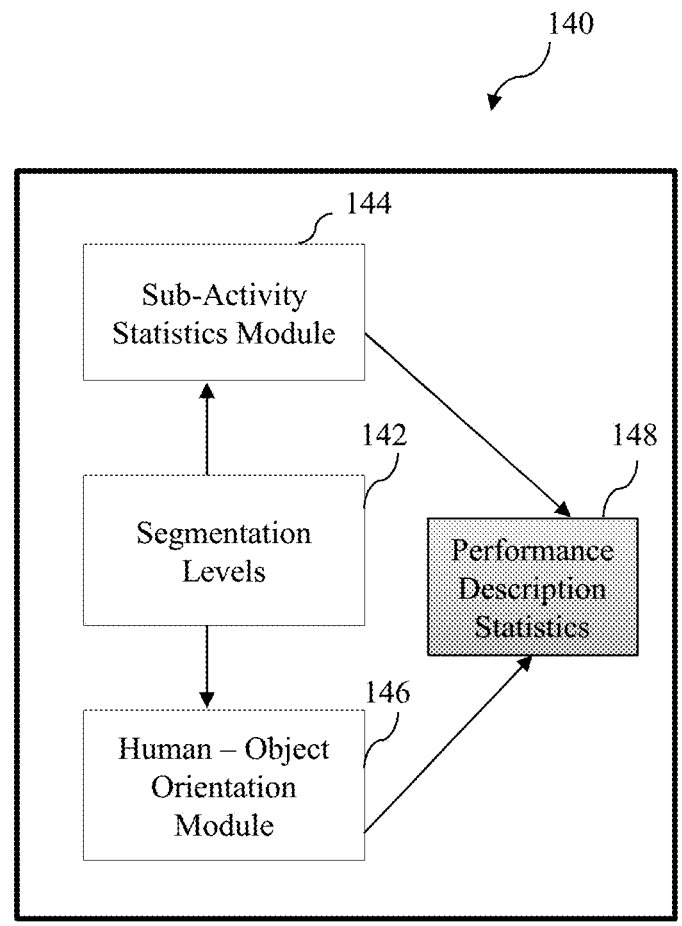
FIG. 4 is a block diagram representation of a task evaluation subsystem of a system for building computational models of a goal driven task from demonstration in accordance with an embodiment of the present disclosure.

The task evaluation subsystem 140 is also configured to provide an activity guidance feedback in real-time to the one or more actors using one or more types of alerts based on the type of the activity step identified. In one embodiment, the activity guidance feedback may include a positive feedback to proceed with a subsequent process within the goal-driven task when the type of activity step executed by the one or more actors is a correct step. In another embodiment, the activity guidance feedback may include a guidance for fixing one or more mistakes committed by the one or more actors in performing the goal-driven task when the type of the activity step is an erroneous step. In a particular embodiment, the one or more types of the alerts may include at least one of a visual alert, a haptic alert, an audio alert or a combination thereof. The interrelation of different modules of the task evaluation subsystem is depicted in FIG. 4.

With continued reference to FIG. 1, the system 100 also includes a continuous adaptation subsystem 150 operatively coupled to the task evaluation subsystem 140. The continuous adaptation subsystem 150 is configured to enable enhancement of the activity model based on the activity guidance feedback provided upon evaluation of the live video. The continuous adaptation subsystem uses a confidence score of both density estimation model and the activity model to decide whether to include the live new video as an exemplar video to a training dataset for future reference. This dataset is used to fine-tune the activity model at a later time instance which further allows the system to adapt to changes in the data distribution over time.

Figure 5:
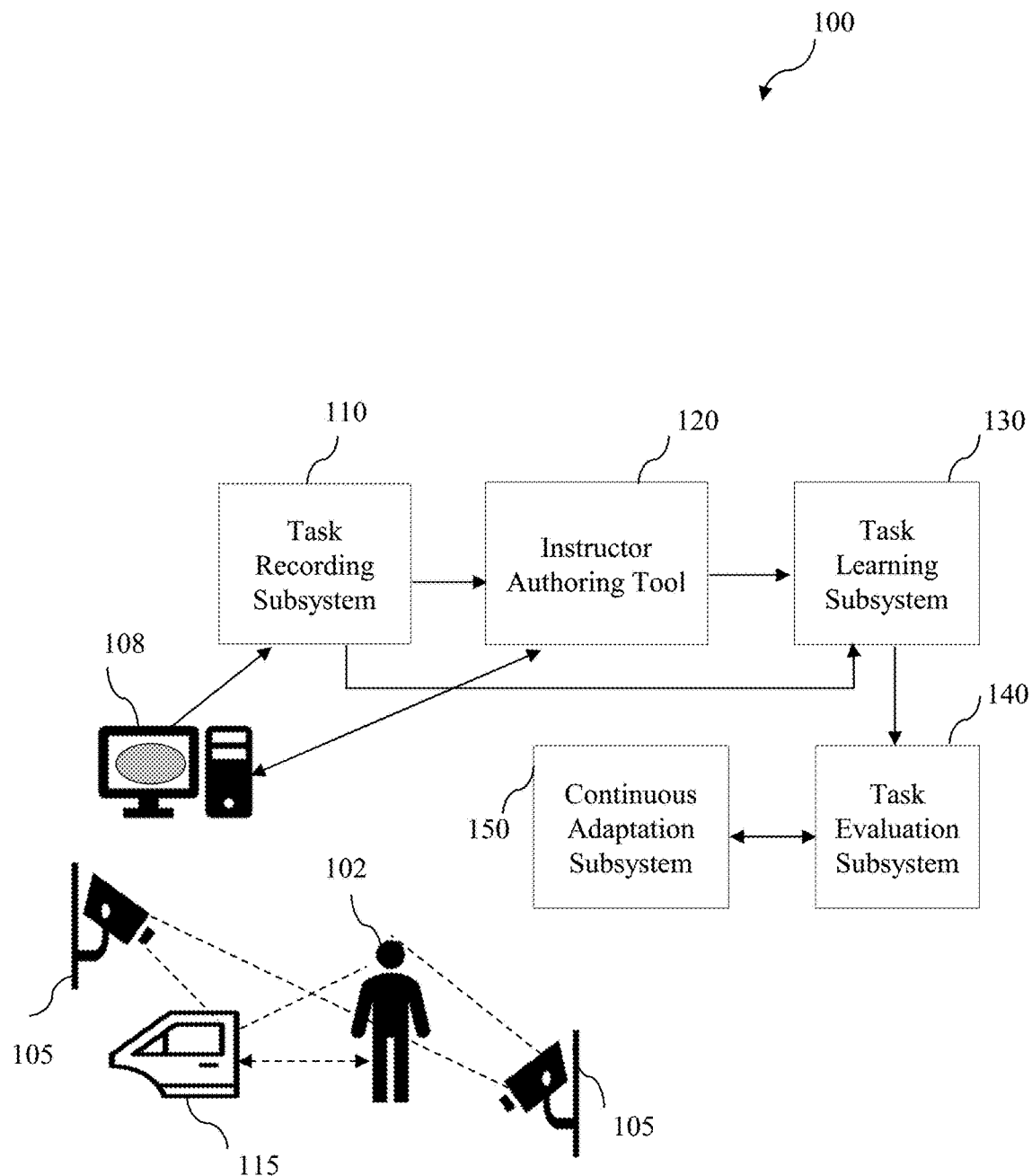
FIG. 5 illustrates a schematic representation of an exemplary system for building computational models of a goal driven task from demonstration of FIG. 1 in accordance with an embodiment of the present disclosure.

FIG. 5 illustrates a schematic representation of an exemplary system 100 for building computational models of a goal driven task from demonstration of FIG. 1 in accordance with an embodiment of the present disclosure. The system 100 provides a solution for analysis, measurement, guidance, and training of a goal-driven physical task performed by one or more workers or one or more actors across industries. Considering an example, in which the system 100 is utilized in a car manufacturing industry for monitoring and analyzing the task of the workers 102. For example, assuming that in the car manufacturing industry, the worker needs to assemble a door of a car. In such a scenario, the system 100 with help of technology assists in upskilling frontline workers across one or more verticals by making it incredibly easy to incorporate AI-based feedback for a goal-oriented physical task. In a manufacturing line scenario, an environment is set up with an image capturing device 105 placed at one or more positions to capture the goal-driven task performed by the one or more actors in real-time. Also, in the environment a computational infrastructure 108 is set up which executes a set of logic to perform the goal-driven task.

The system 100 for providing training to the one or more actors receives a recorded video file or recorded sensor data representative of an expert demonstration for a task under consideration from a task recording subsystem 110. For example, here the task under consideration is assembling the car door. In the example used herein, the expert is the personal skilled in art for assembling the car door. Similarly, the object in this particular example is the car door 115. Here, the recorded video file for fixing the assembly door may be a pre-recorded video obtained from a database.

Once, the recorded video file or the recorded sensor data corresponding to the recorded video is received, an instructor authoring tool (IAT) 120 generates one or more sub-activity proposals from the recorded video file or the recorded sensor data. The IAT 120 includes several modules which analyzes a subset of videos of the recoded video file to get annotations for the training. For example, a segment proposal module samples one or more sub-activity proposals for segmentation of the task represented in the recorded video file or recorded sensor data. A key frame estimation module of the IAT 120 estimates one or more key frames in the recorded video file based on the one or more sub-activity proposals sampled for segmentation of the task. Also, the IAT 120 includes a video-splicing module divides the recorded video file into one or more sub-clips for generating the one or more sub tasks based on the one or more key-frames estimated and the one or more sub-activity proposals proposed. These clips are then shown on a user interface for an instructor to annotate. The instructor may provide activity labels, change the segments proposed by the splicing module, and propose entirely new segments. The annotations serve two purposes. Firstly, they are used to provide supervision for the segment proposal module and the key estimation module. Secondly, the annotations are fed into a label propagation module which propagates these annotations to the whole dataset and produces video and transcript pairs. In the example used herein, the one or more sub-activity labels may include at least one of annotation of performing one or more correct sub-tasks, specification of one or more optional sub-tasks, specification of one or more essential sub-tasks, order of performance of the one or more sub-tasks, one or more constraints on the order of the performance of the one or more sub-tasks, repetitions of the one or more sub-tasks or a combination thereof.

Further, the video and the transcript pairs along with the recorded sensor data are utilized by a task learning subsystem 130 for learning the goal-driven task. The task learning subsystem 130 learns the one or more sub-tasks represented in the demonstration of the task. Also, the task learning subsystem 130 builds an activity model to predict and locate the task being performed in the recorded video file based on the one or more sub-tasks learnt using at least one of a task learning approach. For example, the at least one of a learning approach may include at least one of a differentiable alignment of videos and transcripts-based learning approach, a similarity-based video alignment approach or a model-based learning approach for extracting temporal features. The differential alignment of the videos and the transcript pairs approach includes utilization of a temporal neural network based on alignment/time warping. It takes videos and transcripts and aligns the frames to weak labels from transcripts. The temporal neural network exploits ordering constraints from the transcripts as a supervision. The temporal neural network estimates probability estimates for each sub-tasks at each frame. The differentiable alignment module then uses a dynamic programming method to align the transcript, conditioned on the probabilities, to produce frame-level segmentation labels.

Again, the similarity-based video-alignment approach involves a neural network (NN). The NN learns a similarity measure over clips from the recorded video. At inference time, the network aligns a live video representative of a live performance of the goal-driven task, to all the recorded or support videos and assigns the labels from the best aligned video. Further, a model-based approach decomposes the recorded video into multiple temporal features before feeding them to a temporal reasoning model. The temporal reasoning model then learns to predict frame-level segmentation labels using these temporal features and initial transcripts as labels. For example, the multiple temporal features may include at least one of object trajectories, human and object poses from the recorded video or a combination thereof. The predictions are then refined and used as pseudo-labels to iteratively improve the temporal reasoning model. For example, the temporal reasoning model may include limited to, a hidden Markov model (HMM), a long short-term memory (LSTM), a 3D convolutional neural network and the like. Upon training of the learning of the sub-tasks, the activity model which is produced is further utilized for inference in task evaluation.

A task evaluation subsystem 140 evaluates a live video representative of the goal-driven task including an interaction between one or more actors and one or more objects based on the activity model built. In the example used herein, the actor may be the one or more workers working in the car manufacturing unit. Specifically, the activity model generates segmentation labels, and these are fed into a sub-activity statistics module of the task evaluation module which generates sub-activity statistics including, but not limited to, number of subtasks performed, and time spent on each sub-task, time taken for each anomalies related to the task and the like. The segmentation labels are also fed to a human-object interaction module of the task evaluation module along with the video which generates human interaction statistics such as how many actors performed a task, a main actor involved in the task and the like based on the interactions of the one or more actors with the target object.

The task evaluation subsystem 140 is also configured to generate at least one performance description statistics based on an evaluation of the live video corresponding to the recorded video file or the recorded sensor data. For example, the performance description statistics may include at least one of duration for each sub-tasks, number of sub-tasks performed, productivity of each actor involved in the one or more sub-tasks, a number of the one or more sub-tasks missed, the human interaction statistics of each of the one or more actors with the object or a combination thereof. The at least one performance description statistics are generated based on an implementation of a deep learning-based object detector for obtaining one or more feature representations of the one or more actors and the object, actor pose estimation, spatial relationship between the one or more actors and the object, interaction prediction or a combination thereof. Also, the task evaluation subsystem 140 identifies a type of activity step executed by the one or more actors in the goal-driven task based on the performance description statistics generated.

The task evaluation subsystem 140 is capable of performing action classification, spatial-temporal video alignment, synthetic data augmentation, visual object discovery, detection, tracking, fine-grained categorization, worker pose estimation, motion tracking, and semantically-grounded 3D reconstruction into a novel visual programming paradigm that generates neuro-symbolic code to confirm the correct performance of an activity by the one or more actors in the live video and searches for improvements to the original process itself. In the example used herein, suppose the type of the activity step includes an erroneous step executed by the one or more actors in performing the goal-driven task. In such a scenario, the task evaluation subsystem 140 provides an activity guidance feedback in real-time to the one or more actors using one or more types of alerts. Here, the activity guidance feedback may include a guidance for fixing one or more mistakes committed by the one or more actors in performing the goal-driven task. Unless the mistakes are not rectified and fixed in a current process, the task evaluation subsystem controls and restricts proceeding of the author to a next advanced step in the goal-driven task. Again, the one or more types of the alerts provided to the one or more actors may include at least one of a visual alert, a haptic alert, an audio alert or a combination thereof. Further, a continuous adaptation subsystem 150 is configured to enable enhancement of the activity model based on the activity guidance feedback provided upon evaluation of the live video. Thus, the system 100 automatically builds the computational models of the goal-driven task performed by humans, by learning from demonstrations of the task and analyze the same task being performed in sensor/video recordings, to provide measurements and analytics, improve efficiency, and guide a frontline worker through the task.

Figure 6:
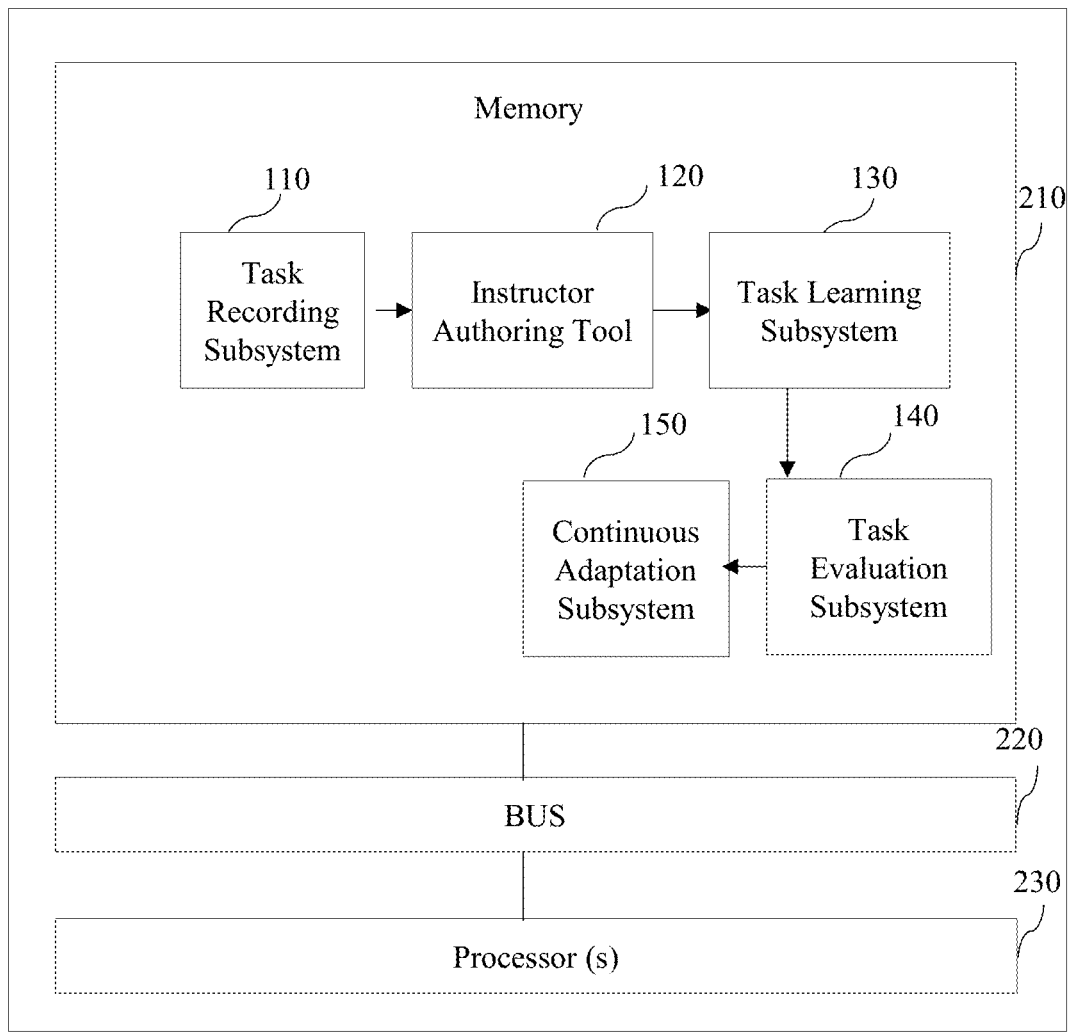
FIG. 6 is a block diagram of a computer or a server in accordance with an embodiment of the present disclosure.

FIG. 6 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 is substantially similar to a system 100 of FIG. 1. The memory 210 has following subsystem: a task recording subsystem 110, an instructor authoring tool 120, a task learning subsystem 130, a task evaluation subsystem 140 and a continuous adaptation subsystem 150.

The task recording subsystem 110 configured to receive a recorded video file or recorded sensor data representative of an expert demonstration for a task under consideration from a database. The instructor authoring tool 120 to generate one or more sub-activity proposals from the recorded video file or the recorded sensor data received. The instructor authoring tool 120 is also configured to enable an instructor to specify one or more sub-activity labels for the task accomplishment upon modification of the one or more sub-activity proposals into one or more sub-tasks. The task learning subsystem 130 is configured to learn the one or more sub-tasks represented in the demonstration of the task based on the recorded video file, the recorded sensor data received, and the one or more sub-activity labels specified. The task learning subsystem 130 is also configured to build an activity model to predict and locate the task being performed in the recorded video file based on the one or more sub-tasks learnt using at least one of a task learning approach. The task evaluation subsystem 140 is configured to evaluate a live video representative of the goal-driven task comprising an interaction between one or more actors and one or more objects based on the activity model built. The task evaluation subsystem 140 is also configured to generate at least one performance description statistics based on an evaluation of the live video corresponding to the recorded video file or the recorded sensor data. The task evaluation subsystem 140 is also configured to identify a type of activity step executed by the one or more actors in the goal-driven task based on the performance description statistics generated. The task evaluation subsystem 140 is also configured to provide an activity guidance feedback in real-time to the one or more actors using one or more types of alerts based on the type of the activity step identified. The continuous adaptation subsystem 150 is configured to enable enhancement of the activity model based on the activity guidance feedback provided upon evaluation of the live video.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 7A:
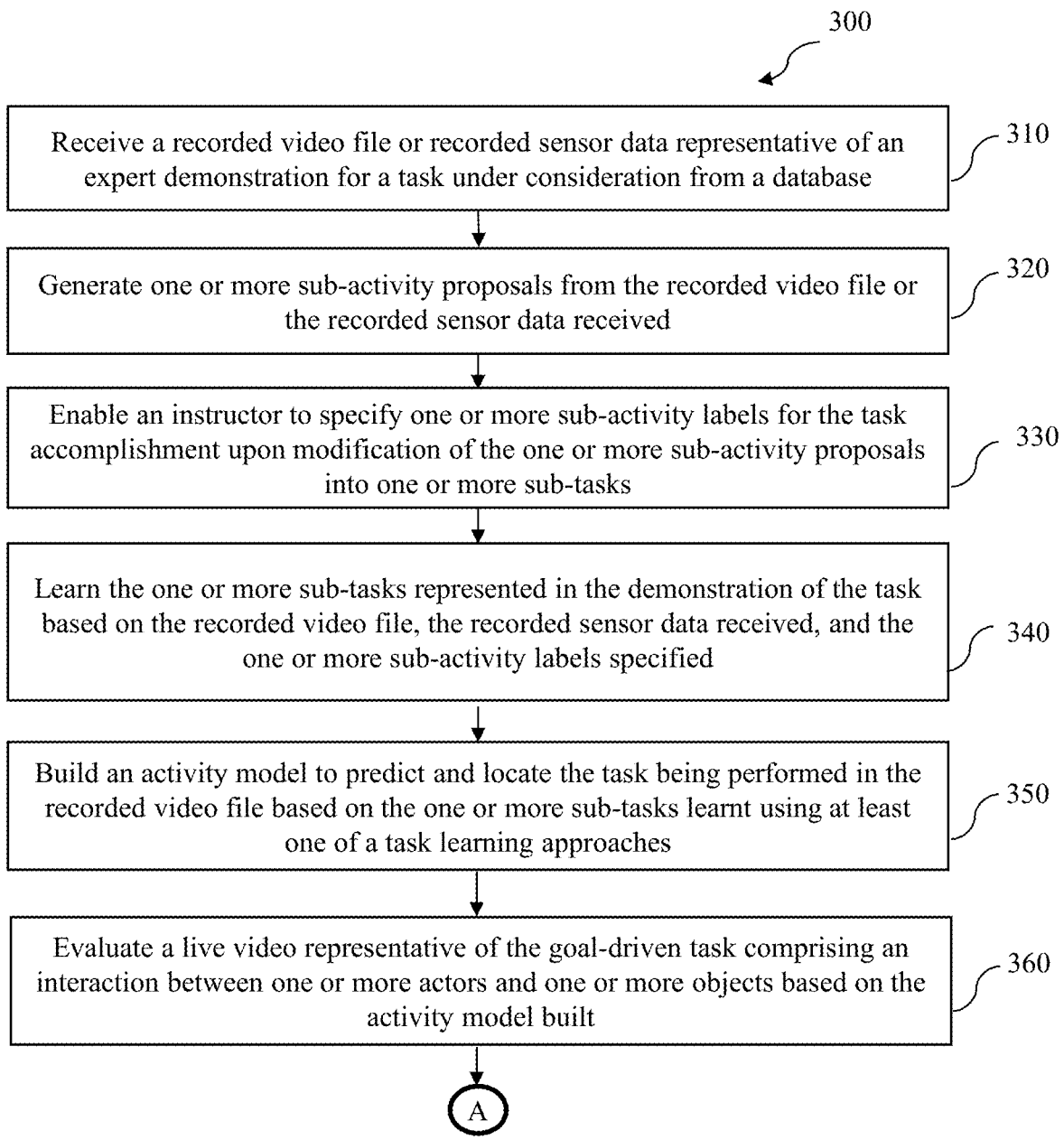
FIG. 7(a) is a flow chart representing the steps involved in a method for building computational models of a goal driven task from demonstration in accordance with the embodiment of the present disclosure.
Figure 7B:
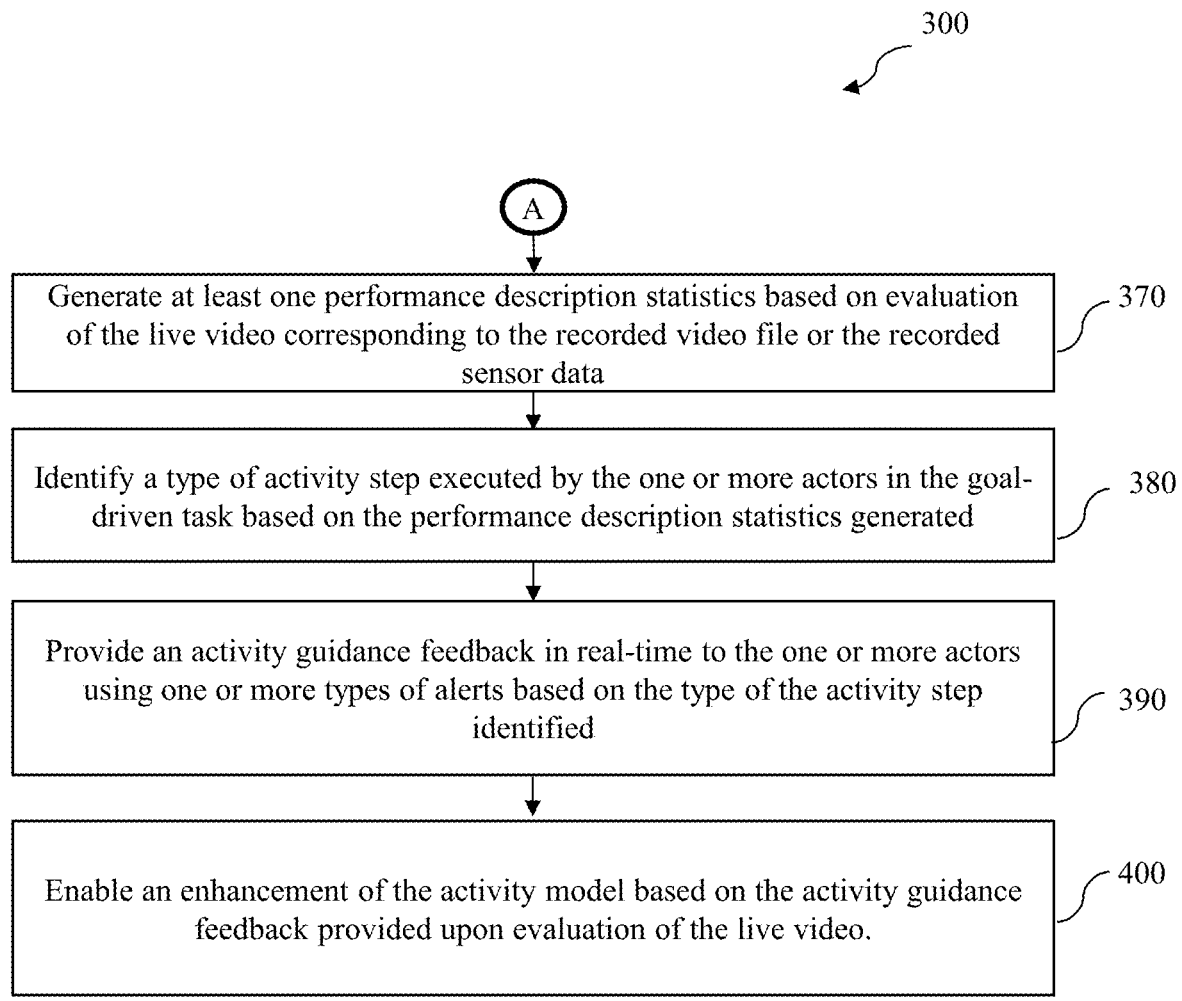
FIG. 7(b) is a flow chart representing the continued steps of FIG. 7(a) in accordance with an embodiment of the present disclosure.

FIG. 7 is a flow chart representing the steps involved in a method 300 for building computational models of a goal driven task from demonstration in accordance with the embodiment of the present disclosure. The method 300 includes receiving, by a task recording subsystem, a recorded video file or recorded sensor data representative of an expert demonstration for a task under consideration from a database in step 310. In one embodiment, receiving the recorded video file or the recorded sensor data representative of the expert demonstration task may include receiving the recorded video file or the recorded sensor data recorded by an image capturing device or an optical sensor respectively. In some embodiment, receiving the recorded video file or the recorded sensor representative of the expert demonstration task may include the recorded video file or the recorded sensor data representative of the demonstration of the task including, but not limited to, performing a lumbar puncture on a medical simulator, assembling a car door in an automobile manufacturing unit, assembling a printed circuit board (PCB) in a manufacturing industry and the like.

The method 300 also includes generating, by an instructor authoring tool, one or more sub-activity proposals from the recorded video file or the recorded sensor data received in step 320. In one embodiment, generating the one or more sub-activity proposals from the recorded video file or the recorded sensor data may include generating the one or more sub-activity proposals by sampling one or more sub-activity proposals for segmentation of the task represented in the recorded video file or recorded sensor data, estimating one or more key frames in the recorded video file based on the one or more sub-activity proposals, divide the recorded video file into one or more sub-clips for generating the one or more sub tasks based on the one or more key-frames estimated and the one or more sub-activity proposals proposed.

The method 300 also includes enabling, by the instructor authoring tool, an instructor to specify one or more sub-activity labels for the task accomplishment upon modification of the one or more sub-activity proposals into one or more sub-tasks in step 330. In one embodiment, enabling the instructor to specify the one or more sub-activity labels may include enabling the instructor specify at least one of annotation of performing one or more correct sub-tasks, specification of one or more optional sub-tasks, specification of one or more essential sub-tasks, order of performance of the one or more sub-tasks, one or more constraints on the order of the performance of the one or more sub-tasks, repetitions of the one or more sub-tasks or a combination thereof.

The method 300 also includes learning, by a task learning subsystem, the one or more sub-tasks represented in the demonstration of the task based on the recorded video file, the recorded sensor data received, and the one or more sub-activity labels specified in step 340. The method 300 also includes building, by the task learning subsystem, an activity model to predict and locate the task being performed in the recorded video file based on the one or more sub-tasks learnt using at least one of a task learning approach in step 350. In one embodiment, building the activity model to predict and locate the task being performed in the recorded video file may include building a computational model which produces an output of the one or more sub-tasks performed along with their duration in a video. In some embodiment, building the activity model using the at least one of the task learning approach may include building the activity model using at least one of a differentiable alignment of videos and transcripts-based learning approach, a similarity-based video alignment approach or a model-based learning approach for extracting temporal features. In such embodiment, the differentiable alignment of the videos and transcripts-based learning approach may include utilization of a temporal neural network for alignment of a plurality of frames of the recorded video file with one or more transcripts.

In another embodiment, building the activity model using the similarity-based video alignment approach may include utilization of a neural network for learning computation of a similarity measure between one or more clips of the recorded video file with one or more clips of a live video. In such embodiment, the computation of the similarity measure may include understanding an inherent structure of the goal-driven task, and models aspects such as permutability of certain sub-tasks, generating a transcript hypothesis which is utilized for scoring against the recorded video or the recorded sensor data for selection of a best hypothesis, sub-dividing the recorded video file into clips of uniform length for further processing.

In yet another embodiment, building the activity model using the model-based learning approach for extracting the one or more temporal features may include decomposing the video into multiple temporal features before feeding into a temporal reasoning model. The temporal reasoning model learns to predict frame-level segmentation labels using the multiple temporal features and initial transcripts as labels. The predictions are then refined and used as pseudo-labels to iteratively improve the temporal model. The temporal reasoning model extracts the one or more temporal features including at least one of object trajectories, human and object poses from the recorded video or a combination thereof. In one embodiment, the temporal reasoning model may include, but not limited to, a hidden Markov model (HMM), a LSTM, a 3D convolutional neural network and the like.

The method 300 also includes evaluating, by a task evaluation subsystem, a live video representative of the goal-driven task comprising an interaction between one or more actors and one or more objects based on the activity model built in step 360. In one embodiment, evaluating the live video representative of the goal-driven task may include evaluating the live video upon generating segmentation labels, generating sub-activity statistics such as number of subtasks performed, and time spent on each sub-task, time taken for each anomalies related to the task and the like, generating human interaction statistics such as how many actors performed a task, a main actor involved in the task and the like.

The method 300 also includes generating, by the task evaluation subsystem, at least one performance description statistics based on evaluation of the live video corresponding to the recorded video file or the recorded sensor data in step 370. In one embodiment, generating the at least one performance description statistics may include generating at least one of duration for each sub-tasks, number of sub-tasks performed, productivity of each actor involved in the one or more sub-tasks, a number of the one or more sub-tasks missed, the human interaction statistics of each of the one or more actors with the object or a combination thereof. In such embodiment, generating the performance description may include generating the performance description based on an implementation of a deep learning-based object detector for obtaining one or more feature representations of the one or more actors and the object, actor pose estimation, spatial relationship between the one or more actors and the object, interaction prediction or a combination thereof. In such embodiment, the deep-learning based object detector may include but not limited to, a faster recurrent neural network (RNN), a 3D-recurrent convolutional neural network (RCNN) and the like.

The method 300 also includes identifying, by the task evaluation subsystem, a type of activity step executed by the one or more actors in the goal-driven task based on the performance description statistics generated in step 380. In one embodiment, identifying the type of the activity step executed by the one or more actors in the goal-driven task may include identifying an erroneous step executed by the one or more actors in performing the goal-driven task. In another embodiment, identifying the type of the activity step may include identifying a correct step executed by the one or more actors in performing the goal-driven task.

The method 300 also includes providing, by the task evaluation subsystem, an activity guidance feedback in real-time to the one or more actors using one or more types of alerts based on the type of the activity step identified in step 390. In one embodiment, providing the activity guidance feedback in the real-time to the one or more actors may include providing a positive feedback to proceed with a subsequent process within the goal-driven task when the type of activity step executed by the one or more actors is a correct step. In another embodiment, providing the activity guidance feedback in the real-time may include providing a guidance for fixing one or more mistakes committed by the one or more actors in performing the goal-driven task when the type of the activity step is an erroneous step. In a particular embodiment, the one or more types of the alerts may include at least one of a visual alert, a haptic alert, an audio alert or a combination thereof.

The method 300 also includes enabling, by a continuous adaptation subsystem, enhancement of the activity model based on the activity guidance feedback provided upon evaluation of the live video in step 400. In one embodiment, enabling the enhancement of the activity model may include computing a confidence score of both density estimation model and the activity model to decide inclusion of the live video as an exemplar video to a training dataset for future reference.

Various embodiments of the present disclosure provides a system which automates monitoring process in industrial and construction settings by understanding repetitive tasks performed in a goal-driven task and notifies safety personnel and workers of safety policy violations that could lead to accidents. The remote monitoring solution provided by the present disclosed system not only improves in easy workforce management across the organizations but also saves human effort and time by reducing physical monitoring process.

Moreover, the present disclosed system produces live guidance of a task being performed in "real-time" mode, spot erroneous steps that a frontline worker makes while performing the modeled goal-directed activity, and demonstrate examples of the correct step retrieved from the training set. Thus, helps in making the complete process automated and effective by removing manual intervention.

Furthermore, the present disclosed system, obtains human poses and virtual or augmented objects, and leverage its temporal causal machinery to model a physical task in the augmented or virtual reality environment.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for building computational models of a goal-driven task from demonstration comprising:
    a task recording subsystem configured to receive a recorded video file or recorded sensor data representative of an expert demonstration for a task under consideration from a database;
    an instructor authoring tool operatively coupled to the task recording subsystem, wherein the instructor authoring tool is configured to:
        generate one or more sub-activity proposals from the recorded video file or the recorded sensor data received; and
        enable an instructor to specify one or more sub-activity labels for the task accomplishment upon modification of the one or more sub-activity proposals into one or more sub-tasks;
    a task learning subsystem operatively coupled to the instructor authoring tool, wherein the task learning subsystem is configured to:
        learn the one or more sub-tasks represented in the demonstration of the task based on the recorded video file, the recorded sensor data received, and the one or more sub-activity labels specified; and
        build an activity model to predict and locate the task being performed in the recorded video file based on the one or more sub-tasks learnt using at least one of a task learning approach;
    a task evaluation subsystem operatively coupled to the task learning subsystem, wherein the task evaluation subsystem is configured to:

evaluate a live video representative of the goal-driven task comprising an interaction between one or more actors and one or more objects based on the activity model built;

generate at least one performance description statistics based on evaluation of the live video corresponding to the recorded video file or the recorded sensor data;

identify a type of activity step executed by the one or more actors in the goal-driven task based on the performance description statistics generated; and provide an activity guidance feedback in real-time to the one or more actors using one or more types of alerts based on the type of the activity step identified; and a continuous adaptation subsystem operatively coupled to the task evaluation subsystem, wherein the continuous adaptation subsystem is configured to enable enhancement of the activity model based on the activity guidance feedback provided upon evaluation of the live video.

2. The system of claim 1, wherein the recorded video file or the recorded sensor data are recorded by an image capturing device or an optical sensor respectively.

3. The system of claim 1, wherein the instructor authoring tool comprises a segment proposal module configured to sample one or more sub-activity proposals for segmentation of the task represented in the recorded video file or recorded sensor data.

4. The system of claim 1, wherein the instructor authoring tool comprises a key-frame estimation module configured to estimate one or more key frames in the recorded video file based on the one or more sub-activity proposals sampled for segmentation of the task.

5. The system of claim 1, wherein the instructor authoring tool comprises a video-splicing module configured to divide the recorded video file into one or more sub-clips for generating the one or more sub tasks based on the one or more key-frames estimated and the one or more sub-activity proposals proposed.

6. The system of claim 1, wherein the one or more sub-activity labels comprises at least one of annotation of performing one or more correct sub-tasks, specification of one or more optional sub-tasks, specification of one or more essential sub-tasks, order of performance of the one or more sub-tasks, one or more constraints on the order of the performance of the one or more sub-tasks, repetitions of the one or more sub-tasks or a combination thereof.

7. The system of claim 1, wherein the task learning approach comprises at least one of a differentiable alignment of videos and transcripts-based learning approach, a similarity-based video alignment approach or a model-based learning approach for extracting temporal features.

8. The system of claim 7, wherein the differentiable alignment of videos and transcripts-based learning approach comprises utilization of a temporal neural network for alignment of a plurality of frames of the recorded video file with one or more transcripts.

9. The system of claim 8, wherein the temporal neural network comprises at least one of a long short-term memory neural network, a temporal convolutional network, a three-dimensional convolutional neural network.

10. The system of claim 7, wherein the similarity-based video alignment approach comprises:

utilization of a neural network for learning computation of a similarity measure between one or more clips of the recorded video file with one or more clips of a live video;

enabling the neural network to align the one or more clips of the recorded video file with the one or more clips of the live video based on the similarity measured; and assigning one or more segmentation labels corresponding to the one or more clips based on an alignment of the recorded video with the live video.

11. The system of claim 7, wherein the model-based learning approach for extracting the one or more temporal features comprises utilization of a temporal reasoning model for extraction of the one or more temporal features comprising at least one of object trajectories, human and object poses from the recorded video or a combination thereof.

12. The system of claim 1, wherein the at least one performance description statistics comprises at least one of duration for each sub-tasks, number of sub-tasks performed, productivity of each actor involved in the one or more sub-tasks, a number of the one or more sub-tasks missed, interaction statistics of each of the one or more actors with the object or a combination thereof.

13. The system of claim 12, wherein the at least one performance description statistics are generated based on an implementation of a deep learning-based object detector for obtaining one or more feature representations of the one or more actors and the object, actor pose estimation, spatial relationship between the one or more actors and the object, interaction prediction or a combination thereof.

14. The system of claim 1, wherein the type of the activity step comprises a correct step executed by the one or more actors in performing the goal-driven task.

15. The system of claim 1, wherein the type of the activity step comprises an erroneous step executed by the one or more actors in performing the goal-driven task.

16. The system of claim 1, wherein the activity guidance feedback comprises a positive feedback to proceed with a subsequent process within the goal-driven task when the type of activity step executed by the one or more actors is a correct step.

17. The system of claim 1, wherein the activity guidance feedback comprises guidance for fixing one or more mistakes committed by the one or more actors in performing the goal-driven task when the type of the activity step is an erroneous step.

18. The system of claim 1, wherein the one or more types of alerts comprises at least one of a visual alert, a haptic alert, an audio alert or a combination thereof.

19. A method comprising:

receiving, by a task recording subsystem, a recorded video file or recorded sensor data representative of an expert demonstration for a task under consideration from a database;

generating, by an instructor authoring tool, one or more sub-activity proposals from the recorded video file or the recorded sensor data received;

enabling, by the instructor authoring tool, an instructor to specify one or more sub-activity labels for the task accomplishment upon modification of the one or more sub-activity proposals into one or more sub-tasks;

learning, by a task learning subsystem, the one or more sub-tasks represented in the demonstration of the task based on the recorded video file, the recorded sensor data received, and the one or more sub-activity labels specified;

building, by the task learning subsystem, an activity model to predict and locate the task being performed in the recorded video file based on the one or more sub-tasks learnt using at least one of a task learning approach;

evaluating, by a task evaluation subsystem, a live video representative of the goal-driven task comprising an interaction between one or more actors and one or more objects based on the activity model built;

generating, by the task evaluation subsystem, at least one performance description statistics based on evaluation of the live video corresponding to the recorded video file or the recorded sensor data;

identifying, by the task evaluation subsystem, a type of activity step executed by the one or more actors in the goal-driven task based on the performance description statistics generated;

providing, by the task evaluation subsystem, an activity guidance feedback in real-time to the one or more actors using one or more types of alerts based on the type of the activity step identified; and enabling, by a continuous adaptation subsystem, enhancement of the activity model based on the activity guidance feedback provided upon evaluation of the live video.

* * * * *